US009398512B2

(12) United States Patent
Muhanna et al.

(10) Patent No.: US 9,398,512 B2
(45) Date of Patent: *Jul. 19, 2016

(54) MOBILE ROUTE OPTIMIZATION

(71) Applicant: Microsoft Technology Licensing, LLC, Redmond, WA (US)

(72) Inventors: Ahmad Muhanna, Richardson, TX (US); Mohamed Khalil, Murphy, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

This patent is subject to a terminal disclaimer.

(21) Appl. No.: 13/953,429

(22) Filed: Jul. 29, 2013

(65) Prior Publication Data

US 2013/0308538 A1    Nov. 21, 2013

Related U.S. Application Data

(63) Continuation of application No. 13/385,643, filed on Feb. 28, 2012, now Pat. No. 8,499,097, which is a continuation of application No. 11/986,458, filed on Nov. 21, 2007, now Pat. No. 8,171,120.

(60) Provisional application No. 60/866,891, filed on Nov. 22, 2006.

(51) Int. Cl.
*H04W 40/02* (2009.01)
*H04W 8/08* (2009.01)
*H04W 12/08* (2009.01)
*H04W 80/04* (2009.01)

(52) U.S. Cl.
CPC ............. *H04W 40/02* (2013.01); *H04W 8/082* (2013.01); *H04W 12/08* (2013.01); *H04W 80/04* (2013.01)

(58) Field of Classification Search
None
See application file for complete search history.

(56) References Cited

U.S. PATENT DOCUMENTS

| | | |
|---|---|---|
| 6,219,547 B1 | 4/2001 | Quaddoura et al. |
| 6,407,988 B1 | 6/2002 | Agraharam et al. |
| 6,456,594 B1 | 9/2002 | Kaplan et al. |
| 6,484,211 B2 | 11/2002 | Turunen |
| 6,804,221 B1 | 10/2004 | Magret et al. |
| 6,842,462 B1 | 1/2005 | Ramjee et al. |
| 6,885,874 B2 | 4/2005 | Grube et al. |
| 6,907,501 B2 | 6/2005 | Tariq et al. |
| 6,973,057 B1 | 12/2005 | Forslow |

(Continued)

FOREIGN PATENT DOCUMENTS

WO    2005101788    10/2005

OTHER PUBLICATIONS

"Final Office Action", U.S. Appl. No. 11/986,458, (Jan. 21, 2011), 14 pages.

(Continued)

*Primary Examiner* — Huy D Vu
*Assistant Examiner* — Hong Shao
(74) *Attorney, Agent, or Firm* — Judy Yee; Micky Minhas

(57) ABSTRACT

Embodiments provide techniques for mobile route optimization authentication protocols. Embodiments allow for system control over whether route optimization is allowed or not allowed. A conditional allowance of route optimization solves several billing and security issues by allowing the system to impose appropriate charges for the route optimization feature or prevent route optimization where message flow using care-of addressing can be monitored.

20 Claims, 1 Drawing Sheet

(56) References Cited

U.S. PATENT DOCUMENTS

| | | |
|---|---|---|
| 6,988,146 B1 | 1/2006 | Magret et al. |
| 6,992,994 B2 | 1/2006 | Das et al. |
| 6,992,995 B2 | 1/2006 | Agrawal et al. |
| 6,999,437 B2 | 2/2006 | Krishnamurthi et al. |
| 7,028,099 B2 | 4/2006 | Troxel et al. |
| 7,092,943 B2 | 8/2006 | Roese et al. |
| 7,143,187 B1 | 11/2006 | Takeda et al. |
| 7,155,518 B2 | 12/2006 | Forslow |
| 7,206,859 B2 | 4/2007 | Narayanan et al. |
| 7,308,506 B1 | 12/2007 | Evans |
| 7,437,154 B2 | 10/2008 | Hahn |
| 7,564,825 B2 | 7/2009 | Olivereau et al. |
| 7,620,979 B2 | 11/2009 | Hippelainen |
| 7,886,075 B2 | 2/2011 | Molteni et al. |
| 7,965,695 B2 | 6/2011 | Valko et al. |
| 8,171,120 B1 | 5/2012 | Muhanna et al. |
| 8,499,097 B1 | 7/2013 | Muhanna et al. |
| 2002/0009066 A1 | 1/2002 | Shimizu et al. |
| 2003/0016655 A1 | 1/2003 | Gwon |
| 2003/0225887 A1 | 12/2003 | Purnadi et al. |
| 2004/0072564 A1 | 4/2004 | Iwahashi et al. |
| 2005/0232286 A1 | 10/2005 | Lee |
| 2005/0265298 A1 | 12/2005 | Adachi et al. |
| 2006/0240825 A1 | 10/2006 | Funabiki et al. |
| 2006/0245362 A1 | 11/2006 | Choyi |
| 2006/0268901 A1 | 11/2006 | Choyi et al. |
| 2007/0081512 A1* | 4/2007 | Takeda .................. H04L 63/164 370/349 |
| 2007/0094394 A1 | 4/2007 | Singh et al. |
| 2007/0113075 A1 | 5/2007 | Jo et al. |
| 2007/0230459 A1 | 10/2007 | Giaretta et al. |
| 2007/0258424 A1* | 11/2007 | Wable .................... H04L 45/52 370/338 |
| 2008/0013493 A1 | 1/2008 | Wu et al. |
| 2008/0192758 A1 | 8/2008 | Mahkonen |
| 2009/0177887 A1 | 7/2009 | Li |
| 2009/0265453 A1 | 10/2009 | Hirano et al. |
| 2010/0226313 A1* | 9/2010 | Sugimoto ........... H04L 63/0281 370/328 |
| 2011/0090842 A1* | 4/2011 | Hirano ................... H04L 63/12 370/328 |

OTHER PUBLICATIONS

"Non-Final Office Action", U.S. Appl. No. 11/986,458, (Aug. 24, 2010),12 pages.

"Non-Final Office Action", U.S. Appl. No. 13/385,643, (Oct. 17, 2012),14 pages.

"Notice of Allowance", U.S. Appl. No. 11/986,458, (Nov. 18, 2011),7 pages.

"Notice of Allowance", U.S. Appl. No. 13/385,643, (Mar. 26, 2013), 8 pages.

Deering, S et al., "Internet Protocol, Version (IPv6) Specification", *Network Working Group; The Internet Society*, (1998), 40 pages.

Johansson, Fredrik et al., "Mobile IPv4 Extension for Carrying Network Access Identifiers", *Network Working Group; The Internet Society*, (2004),9 pages.

Johnson, David B., et al., "Mobility Support in IPv6", *Network Working Group; The Internet Society*, (Jun. 2004),166 pages.

Perkins, "IP Mobility Support", *RFC2002*, (Oct. 1996), 74 pages.

Perkins, C et al., "IP Mobility Support for IPv4", *Network Working Group; The Internet Society*, (2002),100 pages.

Perkins, Charles E., et al., "Securing Mobile IPv6 Route Optimization Using a Static Shared Key", *Network Working Group; The Internet Society*, (2004), 8 pages.

Rexford, Jennifer "Route Optimization in IP Networks", (2006), 23 pages.

* cited by examiner

MOBILE ROUTE OPTIMIZATION

PRIORITY

This application is a continuation of and claims priority to U.S. patent application Ser. No. 13/385,643, filed on Feb. 28, 2012, which in turn is a continuation of U.S. Pat. No. 8,171,120, filed on Nov. 21, 2007, and which all claim priority to U.S. Provisional Patent Application Ser. No. 60/866,891 filed on Nov. 22, 2006, the disclosures of which are incorporated in their entirety by reference herein.

BACKGROUND

Present-day Internet communications represent the synthesis of technical developments begun in the 1960s. During that time period, the Defense Department developed a communication system to support communication between different United States military computer networks, and later a similar system was used to support communication between different research computer networks at United States universities.

The Internet

The Internet, like so many other high tech developments, grew from research originally performed by the United States Department of Defense. In the 1960s, Defense Department officials wanted to connect different types of military computer networks. These different computer networks could not communicate with each other because they used different types of operating systems or networking protocols.

While the Defense Department officials wanted a system that would permit communication between these different computer networks, they realized that a centralized interface system would be vulnerable to missile attack and sabotage. To avoid this vulnerability, the Defense Department required that the interface system be decentralized with no vulnerable failure points.

The Defense Department developed an interface protocol for communication between these different network computers. A few years later, the National Science Foundation (NSF) wanted to connect different types of network computers located at research institutions across the country. The NSF adopted the Defense Department's interface protocol for communication between the research computer networks. Ultimately, this combination of research computer networks would form the foundation of today's Internet.

Internet Protocols

The Defense Department's interface protocol was called the Internet Protocol (IP) standard. The IP standard now supports communication between computers and networks on the Internet. The IP standard identifies the types of services to be provided to users and specifies the mechanisms needed to support these services. The IP standard also describes the upper and lower system interfaces, defines the services to be provided on these interfaces, and outlines the execution environment for services needed in this system.

A transmission protocol, called the Transmission Control Protocol (TCP), was developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a sensible addressing scheme that reflects the internal organization of the network or sub-network All information packets transmitted over the Internet will have a set of IP header fields containing this IP address.

A router is located on a network and is used to regulate the transmission of information packets into and out of computer networks and within sub-networks. Routers are referred to by a number of names including Home Agent, Home Mobility Manager, Home Location Register, Foreign Agent, Serving Mobility Manager, Visited Location Register, and Visiting Serving Entity. A router interprets the logical address of an information packet and directs the information packet to its intended destination. Information packets addressed between computers on the subnetwork do not pass through the router to the greater network, and as such, these sub-network information packets will not clutter the transmission lines of the greater network. If an information packet is addressed to a computer outside the sub-network, the router forwards the packet onto the greater network.

The TCP/IP network includes protocols that define how routers will determine the transmittal path for data through the network. Routing decisions are based upon information in the IP header and entries maintained in a routing table. A routing table possesses information for a router to determine whether to accept the communicated information packet on behalf of a destination computer or pass the information packet onto another router in the network or subnetwork. The routing table's address data enables the router to accurately forward the information packets.

The routing table can be configured manually with routing table entries or with a dynamic routing protocol. In a dynamic routing protocol, routers update routing information with periodic information packet transmissions to other routers on the network. This is referred to as advertising. The dynamic routing protocol accommodates changing network topologies, such as the network architecture, network structure, layout of routers, and interconnection between hosts and routers. Internet Control Message Protocol (ICMP) information packets are used to update routing tables with this changing system topology.

The IP-Based Mobility System

The Internet protocols were originally developed with an assumption that Internet users would be connected to a single, fixed network. With the advent of portable computers and cellular wireless communication systems, the movement of Internet users within a network and across network boundaries has become common. Because of this highly mobile Internet usage, the implicit design assumption of the Internet protocols has been violated.

In an IP-based mobile communication system, the mobile communication device (e.g. cellular phone, pager, computer, etc.) is called a mobile node. Typically, a mobile node changes its point of attachment to a foreign network while maintaining connectivity to its home network. A mobile node may also change its point of attachment between sub-networks in its home network or foreign network. The mobile node will always be associated with its home network and sub-network for IP addressing purposes and will have information routed to it by routers located on the home and foreign network. Generally, there is also usually a correspondence node, which may be mobile or fixed, communicating with the mobile node.

IP Mobility Protocols

During the formative years since the Internet was first established, Internet Protocol version 4 (1Pv4) was recognized and adopted as the standard version of the Internet Protocol. With the advent of mobile IP and proliferation of computers and computer systems linked to the Internet, various limitations in the 1Pv4 standard and associated procedures have developed and emerged. In response, new standards are evolving and emerging.

The most pressing limitation in the 1Pv4 standard is the restriction on the number of possible IP addresses imposed by the 32-bit address field size. A newer standard, the Internet Protocol version 6 (IPV 6), increases the size of the available address space 400% to 128 bits, which vastly increases the number of available addresses. While the 32-bit address field provides $2^{32}$ or approximately 4 billion IP address possibilities, a 128-bit field provides $2^{128}$ ($340\times10^{12}$) IP address possibilities.

A number of benefits emerge from this vastly larger available address field. First, there is little chance of exhausting the number of IP addresses. Second, a large address field allows aggregation of many network-prefix routers into a single network-prefix router. Finally, the large address pool allows nodes to auto configure using simple mechanisms. One practical advantage as a result is elimination of designated foreign agents to route information packets to a visiting mobile node on a foreign network.

IP Mobility Care-of Addressing

In a mobile IP network, nodes will transmit notification and discovery information packets onto the network to advertise their presence on the network and solicit advertisements from other nodes. While on a foreign network, a mobile node will be assigned a care-of address that will be used to route information packets to the foreign network and the attached mobile node. An advertisement from a router on the foreign network will inform a mobile node that is attached to a foreign network. The mobile node will typically create a care-of address on the foreign network, which it will transmit to its home network in an information packet to register the care-of address. Information packets addressed to the mobile node on the home network have the care-of address added. This information packet containing the care-of address will then be forwarded and routed to the mobile node on the foreign network by a router on the foreign network according to the care-of address.

Authentication, Authorization and Accounting ("AAA")

In an IP-based mobile communications system, the mobile node changes its point of attachment to the network while maintaining network connectivity. When a mobile node travels outside its home administrative domain, however, the mobile node must communicate through multiple domains in order to maintain network connectivity with its home network. While connected to a foreign network controlled by another administrative domain, network servers must authenticate, authorize and collect accounting information for services rendered to the mobile node. This authentication, authorization, and accounting activity is called "AAA", and AAA servers on the home and foreign network perform the AAA activities for each network.

Authentication is the process of proving one's claimed identity, and security systems on a mobile IP network will often require authentication of the system user's identity before authorizing a requested activity. The AAA server authenticates the identity of an authorized user and authorizes the mobile node's requested activity. Additionally, the AAA server will also provide the accounting function including tracking usage and charges for use of transmissions links between administrative domains.

Another function for the AAA server is to support secured transmission of information packets by storing and allocating security associations. Security associations refer to those encryption protocols, nonces, and keys required to specify and support encrypting an information packet transmission between two nodes in a secure format. The security associations are a collection of security contexts existing between the nodes that can be applied to the information packets exchanged between them. Each context indicates an authentication algorithm and mode, a shared or secret key or appropriate public/private key pair, and a style of replay protection.

Route Optimization

Route optimization allows the Mobile Node (MN) to establish a direct link a correspondent node instead of using a care-of address forwarding and encapsulation operation. Route optimization, as its name implies, optimizes the routing efficiency to a Mobile Node, and IPv6 protocol automatically establishes route optimization by default. Because the default procedures in IPv6 protocol, there is a lack of control over the selection and authorization of route optimization feature in the Mobile IPv6 protocol. In the prior art, there is no mechanism to control the route optimization feature. There is a need to control the route optimization feature to control billing options for subscriber charges. Moreover, there is also a security reason to prevent route optimization and force the user to forward transmissions through the home network for monitoring purposes, instead of permitting a direct link between the correspondent node and the mobile node (MN). There is a need for a mechanism to control the route optimization authorization feature.

SUMMARY

Embodiments include a new route optimization authentication protocol. The current Mobile IPv6 protocols do not allow for optional control over the use of route optimization. Various embodiments allow for system control over whether route optimization is allowed or not allowed. The conditional allowance of route optimization solves several billing and security issues by allowing the system to impose appropriate charges for the route optimization feature or prevent route optimization where message flow (using care-of addressing) needs to be monitored through the home network.

BRIEF DESCRIPTION OF THE DRAWINGS

The objects and features of various embodiments will become more readily understood from the following detailed description and appended claims when read in conjunction with the accompanying drawings in which like numerals represent like elements and in which:

DETAILED DESCRIPTION

Figure 1:
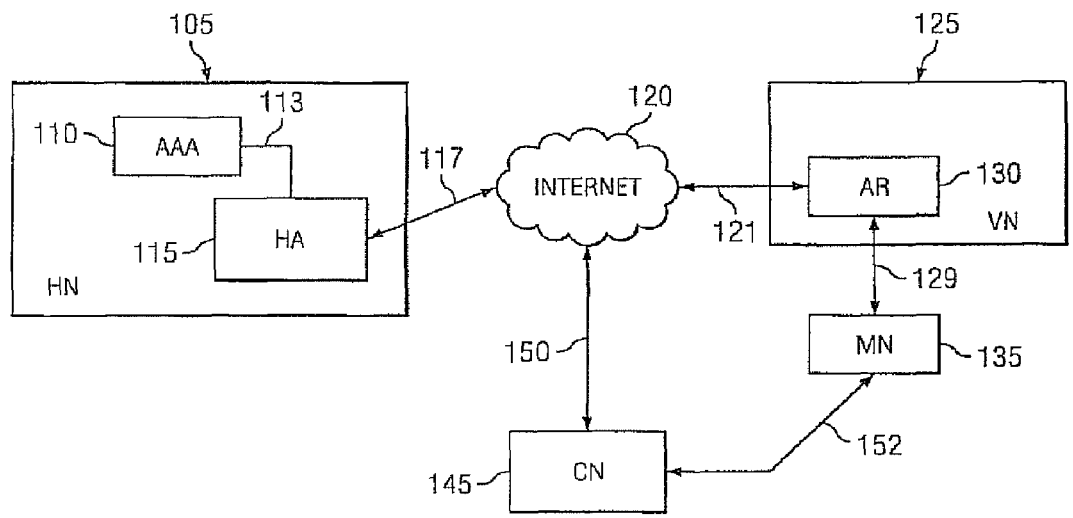
FIG. 1 is a diagram of a mobile IP wireless communication network compatible with Mobile IPv6.

FIG. 1 shows an embodiment for a mobile IP cellular communication network compatible with Mobile 1Pv6 using various embodiments discussed herein. A home network 105 consists of an Authentication, Authorization, and Accounting server 110. The server 110 is connected to a buss line 113 to a home agent (HA) 115. Communication link 117 connects the HA 115 to the Internet 120. A communication link 121 connects the Internet 120 to a Foreign Agent 130 on a visited network 125. Communication link 129 connects the Foreign Agent 130 to the Mobile Node (MN) 135, and this communication link includes a wireless connection. The Mobile Node 135 can be a communication device, such as a cellular phone, a computer, a router, a personal data assistant (PDA) and handheld terminal, or some other type of host.

The Mobile Node 135 is associated with the Home Agent 115. Information packets sent to the Mobile Node 135 on the home network 105 are routed to the Mobile Node 135 while linked to the foreign network 125. The Home Agent 115 stores an address association in its memory corresponding to the location of the Mobile Node 135 on the foreign network 125. The address association includes the Internet Protocol address of the Mobile Node 135 on the home network 105 and the care-of address corresponding to the topological location of the Foreign Agent 130. As the Mobile Node 135 moves from network to network, the various routing tables and other data tables must be updated to maintain communication with the Mobile Node 135 thereby ensuring the correct routing of information packets.

When Mobile Node 135 movement results in a change in connectivity, the Mobile Node's 135 care-of address must be updated so that the correct router associations on both the Home Agent 115 and the Foreign Agent 130 are maintained. Hand-off procedures involve assignment of a care-of address for the Home Agent 115 to transmit an information packet through the Internet 120, so that the Foreign Agent 130 can route the information packet to the connected Mobile Node 135.

A correspondent node (CN) 145 is coupled to the Home Agent (HA) 115 through communication link 150. When communicating to the MN 135, the correspondent node (CN) 145 initially communicates through the Home Agent (HA) 115. The Home Agent (HA) 115 uses care-of address and packet encapsulation to forward packets to the MN 135 through the visited network 125.

Route optimization allows the CN 145 to communicate directly with the MN 135 over communication link 153, instead of communicating indirectly with MN 135 through communication link 150, Home Agent 115, and the care-of forwarding process through the visited network 125. Such route optimization is always implemented as a mandatory feature in Mobile IPv6, but the route optimization needs to be controlled and authorized so that billings to the user can be adjusted if route optimization is allowed and security and monitoring features can be invoked by disallowing route optimization. By disallowing the route optimization, all messages between the correspondent node (CN) 145 and the mobile node (MN) 135 can be monitored at the home network 105.

In this manner, the route optimization authorization can be selectively activated or disallowed by the system protocols to accommodate these billing and security requirements of the system. The increased flexibility added to the system through the use of the discussed embodiments is significant, and the benefits achievable from the use of the discussed embodiments are substantial.

Figure 2:
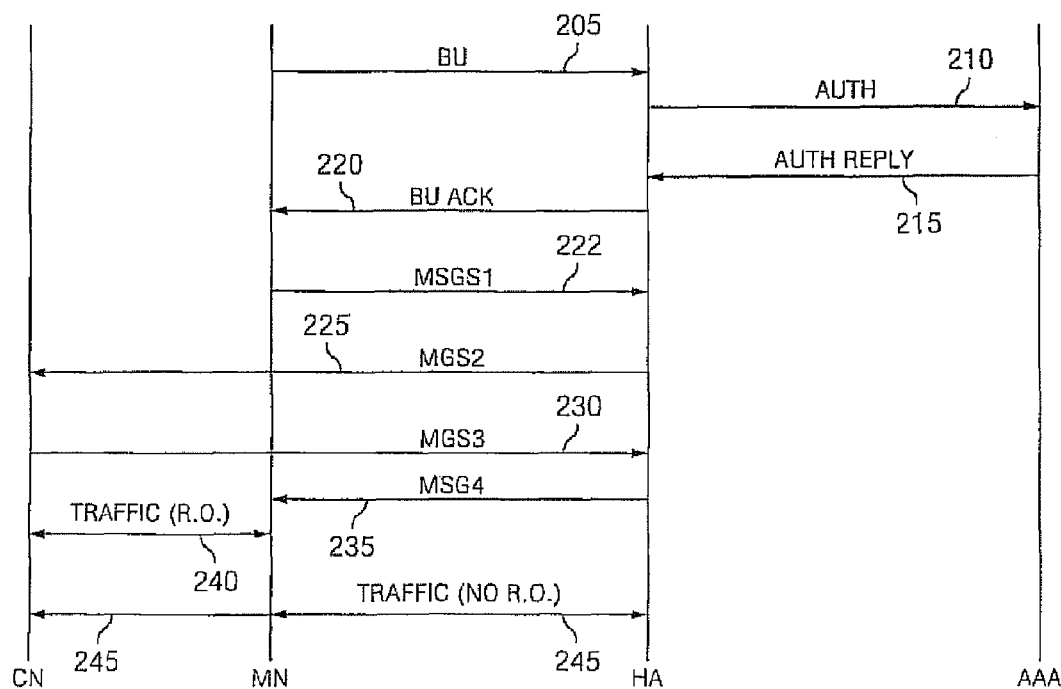
FIG. 2 is the message flow of one or more embodiments for authentication and authorization of the Mobile Node using the route optimization authentication option.

FIG. 2 shows one embodiment of a message flow for authorization of route optimization during the authentication and authorization initialization process. Embodiments may also include a route optimization authorization as a purely periodic function or in response to a user or system initiated protocol. For the purposes of the discussed embodiments, the route optimization authorization will be explained in relation to the initialization process shown in FIG. 2.

As set forth therein, in step 205, the MN 135 generates a Binding Update (BU) message and transmits that message to the home agent (HA) 115. The BU 205 message tells the Home Agent (HA) 115 where the mobile node (MN) 135 is located. This location information would provide the Home Agent (HA) 115 with information on the visited network 125 supporting the communications to the MN 135. The care-of address information for this visited network 125 would be provided to the Home Agent (HA) 115, so that message forwarding can be conducted by the Home Agent 115.

The Home Agent 115 will transmit an authorization (AUTH) message 210 over communication link 113 to the AAA server 110. The AAA server 110 is the authorization, authentication and accounting server that maintains (as its name would imply) authentication information, accounting information, and authorization information for users associated with home network 105. The authorization (AUTH) message 210 will inquire from AAA server 110 whether the Mobile Node MN 135 initiating the Binding Update message 210 has been authenticated, and if so, if that MN 135 has an active account that is authorized to support mobile communications under Mobile IPv6 and whether route optimization is permitted to that Mobile Node (MN) 135. Also, accounting information and status codes can be provided for particular mobile nodes on the system. The authorization AUTH 210 message contains all the required identification information for the AAA server 110 to conduct its analysis of the Mobile Node MN 135.

In response to the authorization AUTH 210 message, the AAA server 110 will respond to the Home Agent 115 with an authorization AU Reply message 215. The AU Reply 215 message will provide the Home Agent 115 with an indicator of whether route optimization is authorized under Mobile 1Pv6 protocols, and whether or not route optimization is authorized for the mobile node MN 135.

If the communication protocol does not support communication to the Mobile Node MN 135 under Mobile 1Pv6, then route optimization will not be supported. The AAA server 110 will indicate that route optimization is not supported in the AU Reply message 215. The AU Reply 215 may include a separate attribute that indicates "MIPs=No" to show that Mobile IPv6 communications are not supported by the system for communications with Mobile Node MN 135.

If the communication protocol supports communication to the Mobile Node (MN) 135 under Mobile 1Pv6, then the AAA server 110 will designate in the AU Reply message 215 whether route optimization is authorized or not. The AU Reply message 215 could include a separate attribute in the AU Reply 215 that indicates "MIPs=Y" to show Mobile IPv6 protocols support communication with Mobile Node 135 and RO=Y to indicate that route optimization is supported for communications to Mobile Node MN 135. If route optimization is not supported to Mobile Node MN 135 for this type of communication, then the attributes would be set at "MIPs=Y" and "RO=N" to show Mobile 1Pv6 is supported, but route optimization is not authorized to Mobile Node MN 135.

As an alternative, there are codes in the AU Reply 215 that can be set to indicate whether route optimization is authorized or not authorized. For instance, a status code could be set to a value of less than 128 if route optimization is not authorized or above 128 if route optimization is authorized. This code would use as pre-existing attribute value in the AU Reply 215 packet, instead of creating a new attribute or modifying the existing data packet structure used in Mobile IPv6 protocols. Other types of codes or flags can be used in the existing packet structure of the Mobile IPv6 packet to indicate whether Mobile 1Pv1 is supported and whether or not route optimization is authorized.

After receiving the AU Reply 215 message, the home agent 115 communicates a Binding Update acknowledgement (BU Ack) 220 message to the Mobile Node 135. This BU Ack 220 message includes an indication of whether route optimization is supported or not. The indication of route optimization authorization can be shown as a separate attribute (e.g. "R.O. Y" or "R.O.=N") for a Mobile 1Pv6 packet or as a value for a pre-existing attribute (attribute<128 means "RO No" or Attribute>128 means "RO=Yes") in the Mobile 1Pv6 packet.

As an additional option, a code message can be communicated to the Mobile Node MN 135 from the home agent 115 to indicate whether route optimization is authorized and supported. The code message can indicate "MIPv6 authorization successful, but Route Optimization is Not Allowed," "MIPv6 authorization not successful," or "MIPv6 authorization successful and Route Optimization Allowed" depending on the communication protocol supported and the route optimization authorization.

If communications involving the Mobile Node 135 are supported under Mobile IPv6 and Route Optimization is authorized, then route optimization signaling messages (MSG 1, MSG2, MSG3 and MSG4) are transmitted between the MN 135, the home agent HA 115, and the correspondent node CN 145 to initialize and initiate the route optimization communications. Specifically, if route optimization is authorized based on the receipt of the BU Ack 220 message, the Mobile Node 135 responds to the Home Agent HA 115 with MSGI at step 222. The Home Agent HA 115 transmits a message MSG2 225 to the correspondent node 145, and the correspondent node 145 responds to the Home Agent HA 115 with message MSG3 230. The home agent HA 115 then signals the Mobile Node MN 135 with message MSG4 to complete the route optimization initialization communications. Thereafter, the route optimization communication traffic is transmitted directly between the Mobile Node MN 135 and the correspondent node CN 145 as shown in step 240. If route optimization is not permitted, then the communication traffic to the Mobile Node MN 135 from the correspondent node CN 145 is transmitted through the home agent HA 115 as shown in step 245.

While embodiments have been particularly shown and described with respect to various embodiments, it will be readily understood that minor changes in the details of various embodiments may be made without departing from the spirit of the embodiments.

What is claimed is:

1. A device-implemented method comprising:
    determining whether one or more route optimization protocols are permitted allowing direct communication between a mobile node and a correspondent node, or whether the one or more route optimization protocols are not permitted such that communication between the correspondent node and the mobile node is to be routed through a home network; and
    confirming route optimization by sending a first acknowledgement message for receipt by the mobile node and by sending a second acknowledge message for receipt by the correspondent node, the second acknowledgement message including a route optimization status indicating to the correspondent node whether route optimization with the mobile node is permitted.

2. A method as recited in claim 1, wherein said determining comprises querying an authentication, authorization, and accounting (AAA) server as to whether the one or more route optimization protocols are permitted.

3. A method as recited in claim 1, wherein said determining is based on one or more of billing parameters or security parameters for the home network.

4. A method as recited in claim 1, wherein said determining and said confirming are performed on a periodic basis and independent of a user-initiated protocol.

5. A method as recited in claim 1, wherein said determining and said confirming are performed in response to a user-initiated protocol.

6. A method as recited in claim 1, wherein one or more of the first acknowledgement message or the second acknowledgement message are sent via the Internet.

7. A method as recited in claim 1, wherein the device comprises a router for the home network.

8. A method comprising:
    determining via a home agent whether one or more route optimization protocols are permitted allowing direct communication between a mobile node and a correspondent node, or whether the one or more route optimization protocols are not permitted such that communication between the correspondent node and the mobile node is to be routed through a home network;
    transmitting a first acknowledgement message for receipt by the mobile node indicating whether the one or more route optimization protocols are permitted; and
    transmitting a second acknowledgement message for receipt by the correspondent node indicating whether route optimization with the mobile node is permitted.

9. A method as recited in claim 8, wherein the home agent comprises a router for the home network.

10. A method as recited in claim 8, wherein said determining comprises querying an authentication, authorization, and accounting (AAA) server of the home network as whether the one or more route optimization protocols are permitted.

11. A method as recited in claim 8, wherein said determining is performed on a periodic basis and independent of user-initiated protocol.

12. A method as recited in claim 8, wherein said determining is is performed in response to a user-initiated protocol.

13. A method as recited in claim 8, wherein said determining is based on one or more of billing parameters or security parameters for the home network.

14. A method comprising:
    determining whether one or more route optimization protocols are permitted allowing direct communication between a mobile node and a correspondent node, or whether the one or more route optimization protocols are not permitted such that communication between the correspondent node and the mobile node is to be routed through a home network;
    transmitting a first acknowledgement message for receipt by the mobile node indicating whether the one or more route optimization protocols are permitted;
    transmitting a second acknowledgement message for receipt by the correspondent node indicating whether route optimization with the mobile node is permitted; and initiating the one or more route optimization protocols between the mobile node and the correspondent node.

15. A method as recited in claim 14, wherein the method is performed by a router for the home network.

16. A method as recited in claim 14, wherein said determining comprises querying an authentication, authorization, and accounting (AAA) server as whether the one or more route optimization protocols are permitted.

17. A method as recited in claim 14, wherein said determining is performed on a periodic basis and independent of user-initiated protocol.

18. A method as recited in claim 14, wherein said determining is performed in response to a user-initiated protocol.

19. A method as recited in claim 14, wherein said determining is based on one or more of billing parameters or security parameters for the home network.

20. A method as recited in claim 14, wherein said determining comprises receiving a message from an AAA server indicating whether route optimization is supported.

\* \* \* \* \*